United States Patent [19]

Henckels et al.

[11] 4,228,537
[45] Oct. 14, 1980

[54] METHOD OF AND APPARATUS FOR AUTOMATIC FAULT DIAGNOSIS OF ELECTRICAL CIRCUITS EMPLOYING ON-LINE SIMULATION OF FAULTS IN SUCH CIRCUITS DURING DIAGNOSIS

[75] Inventors: Lutz Henckels, Lexington; René Haas, Cambridge; Ralph Anderson, Carlisle, all of Mass.

[73] Assignee: GenRad, Inc., Concord, Mass.

[21] Appl. No.: 937,789

[22] Filed: Aug. 29, 1978

Related U.S. Application Data

[63] Continuation of Ser. No. 809,101, Jun. 22, 1977, abandoned, which is a continuation of Ser. No. 583,539, Jun. 4, 1975, abandoned, which is a continuation of Ser. No. 443,853, Feb. 19, 1974, abandoned.

[51] Int. Cl.³ ............................................. G01R 31/28
[52] U.S. Cl. .................................. 371/23; 324/73 R; 371/20
[58] Field of Search ............................ 235/302, 302.1; 364/200, 900; 324/73 R; 371/23, 15, 20

[56] References Cited

U.S. PATENT DOCUMENTS

| 3,631,100 | 1/1972 | Heilweil et al. | 324/73 R |
| 3,715,573 | 2/1973 | Vogelsberg | 364/300 |
| 3,780,277 | 12/1973 | Armstrong et al. | 235/302.1 |
| 3,927,371 | 12/1975 | Pomerane et al. | 235/302.1 |
| 3,961,250 | 6/1976 | Snethen | 324/73 R |

*Primary Examiner*—Charles E. Atkinson
*Attorney, Agent, or Firm*—Rines and Rines, Shapiro and Shapiro

[57] ABSTRACT

This disclosure is concerned with the use of on-line simulation of circuit faults during diagnosis to generate a small part of a complete fault dictionary needed for diagnosis of the circuit, being adapted for use of a mini-computer-based automated test system having only a small amount of secondary storage; and being adapted for an exact match diagnosis with modeled failures, and a heuristic approach for a partial match of faulty behaviour that leads to a highly probable diagnosis.

9 Claims, 6 Drawing Figures

METHOD OF AND APPARATUS FOR AUTOMATIC FAULT DIAGNOSIS OF ELECTRICAL CIRCUITS EMPLOYING ON-LINE SIMULATION OF FAULTS IN SUCH CIRCUITS DURING DIAGNOSIS

This is a continuation application of Ser. No. 809,101, filed June 22, 1977, which is a continuation of Ser. No. 583,539, filed June 4, 1975, which is in turn a continuation of Ser. No. 443,853, filed Feb. 19, 1974, all of which are now abandoned.

The present invention relates to methods of and apparatus for automatic fault diagnosis employing on-line simulation of faults in such circuits during diagnosis.

Heretofore, systems have been employed, such as the CAPABLE type automatic fault isolator marketed by Computer Automation, Inc. of California (CAI), Bulletin entitled "CAPABLE Product Expansion Note #8", 1971, wherein a known circuit is constructed with externally mounted parts, such as integrated circuit units (IC), and tests are made by introducing short-circuits and other failures in such parts to record, in response to known input stimuli to the circuit, the response of such failures in comparison with a good or properly operative circuit, thereby to produce a group of fault responses corresponding to the specific faults—a so-called fault "dictionary". Since there are a large number of possible or likely faults and a large number of tests required to catalog the same, such a system must, for economy of storage and size, use only a partial fault dictionary, though some prior manual matching systems, with visual look-up in listings of faults, have been otherwise employed, as in the very voluminous printed fault dictionaries prepared, for example, by Telpar Incorporated of Dallas, Tex., ("User's Guide To Testaid", April, 1971). In operation, one tries to match a detected variance in the behavior of a known good circuit with a response in the partial fault dictionary in order to diagnose the failure in the circuit. Because such systems employ only a partial fault dictionary, however, it is likely that many different faults can exhibit the same partial fault response; and it is also possible that a wrong answer can be provided. The system is, moreover, limited by what has been pre-prepared in assembling the partial fault dictionary and is not adaptively operative to perform more sophisticated diagnosis, as of multiple faults. Additionally, such a system not only involves pre-preparation of the fault dictionary, but requires an actual operating circuit; and, because of the use of external mounting of parts, does not lend itself to hybrid and high-speed circuit boards and the like.

Another approach to this problem, has been by way of employing a large computer with massive storage to generate the fault dictionary by simulating the responses of predetermined faults, and which is then used during the testing phase by the operator as an aid to his fault diagnosis. Such service is also offered by said Telpar, which employs the IBM Series 360 computer to generate the fault dictionary. Not only is such an operation disadvantageous in its use of a separate and perhaps remote large computer, off-line from the testing procedures, and with the cumbersome problems of preset and unadaptive multiple dictionaries necessitated by circuit boards with slight revisions or modifications, but the operator is required to perform a most laborious, repetitive task in fault look-up, with considerable chance of error.

Comparison of the merits of simulated faults with actual physical insertions of failures in diagnostic test development is described, for example, in Digest of Papers, 1972 *International Symposium on Fault-Tolerant Computing,* IEEE Computer Society, June 19-21, 1972 (72CH0623-9C), pp. 42-46, and elsewhere. See, also, *Circuits Manufacturing,* January, 1974, p. 56, which describes some of the above problems of automated fault diagnosis, as well. The various types of faults involved, moreover, are described, for example, by Friedman and Menon, *Fault Detection in Digital Circuits,* Prentice-Hall, 1971, commencing on p. 7 and elsewhere.

An object of the present invention is to provide a new and improved method of and apparatus for automatic fault diagnosis that shall not be subject to the above-mentioned and other disadvantages of prior techniques and systems; but that, to the contrary, requires a limited prepared partial fault dictionary only, which is supplemented by on-line fault simulation to improve diagnostic resolution and provide a highly adaptive testing diagnosis, and without even requiring the physical presence of a known good circuit to prepare the partial fault dictionary for diagnosing a unit under test (so-called UUT).

A further object is to provide such a novel method and apparatus that is particularly suited to digital circuit fault analysis and that may use a mini computer.

Another object is to provide a novel adaptive fault detection and identifying method and system of more general applicability, as well, that, by combining the partial fault dictionary facility with on-line supplemental fault simulation, using all information gathered, provides an optimum diagnosis resolution for the particular test program.

Still an additional object is not only to diagnosis previously defined faults in an algorithmically modeled manner, but to enable the heuristic simulation of faults, including multiple faults, not previously modeled.

Other and further objects will be explained hereinafter and are more particularly delineated in the appended claims. In summary, the invention embraces a method of on-line simulation to generate a small part of a complete fault dictionary needed for diagnosis of, for example, a given circuit board, permitting the use of a mini-computer based automated test system equipped with only a small amount of secondary storage. Single failures are accurately diagnosed by an exact match with modeled failures, while a heuristic approach allows for a partial match of faulty behaviour, leading to a highly probable diagnosis. The method or process underlying the invention, from one of its aspects, comprises preparing a partial fault dictionary of modeled faults of a circuit and storing the same as electrically retrievable responses; subjecting such a circuit to on-line set of tests; comparing the responses to the tests of the tested circuit with responses of a good circuit to detect variations, if existent, from the good circuit responses indicative of faults; passing the tested circuit as good in the absence of such variations; responding to detected variations to extract from the stored partial dictionary a list of possible faults; simulating on-line the faults from said test; and comparing the responses of the faulty circuit under test with the responses of the simulated faults to effect fault diagnosis of the circuit under test.

As will become apparent, a significant advantage of the invention resides in the fact that by using only a partial fault dictionary and by employing on-line simulation of faulty circuits to generate the responses of such circuits, the resolution and comprehensive fault detection capabilities of the full-fault dictionary approach are obtained, without the necessity of the massive storage requirements normally attendant such approach. As will be described in detail hereinafter, this and other significant advantages of the invention are preferably obtained by employing a partial fault dictionary in which, for each test step, fault classes which are first detected at that test step, i.e., produce output responses which vary from those of a good circuit, are grouped in lists according to their external signatures at that test step. This is to be contrasted with the previously described full-fault dictionary approach which stores, for each modeled fault, the response of the faulty circuit to the entire set of test steps. In accordance with the invention, when variations from the known responses of a good circuit are detected during the testing of an actual circuit, the partial fault dictionary provides a list of possible faults, and on-line simulation of circuits having the possible faults is employed to generate the responses of faulty circuits to the set of tests. These responses may then be compared with the responses of the actual circuit to effect fault diagnosis.

The invention will now be described with reference to the accompanying drawings.

Figure 1:
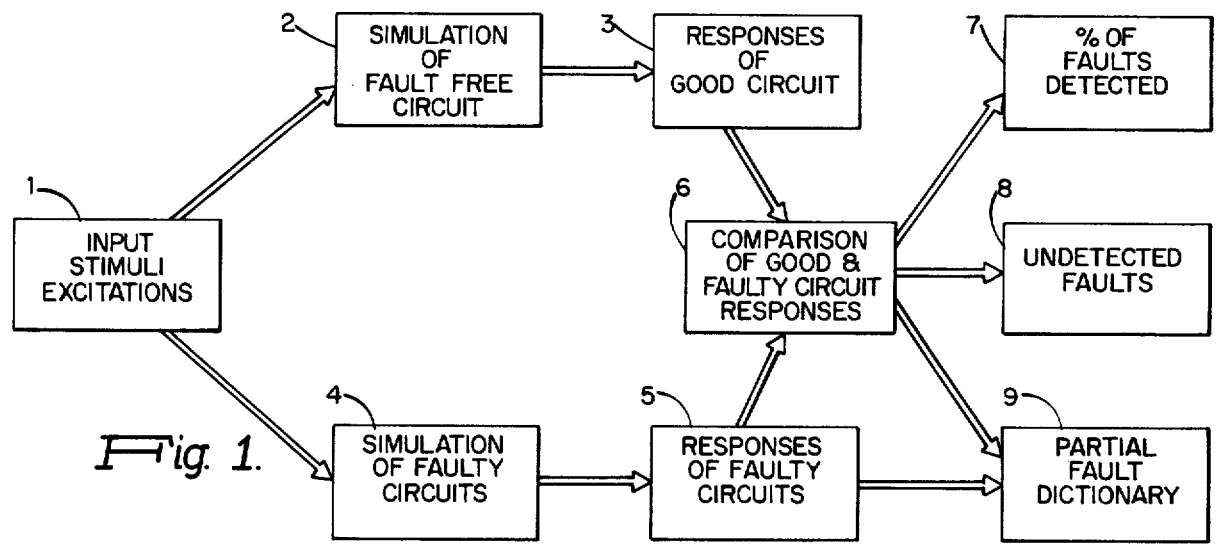
FIG. 1 is a functional or flow block diagram of the preparation phase of the technique underlying the invention.

Considering the illustrative problem of digital logic circuit board testing and the like, in recent years, several factors have contributed toward rendering the go/no-go test insufficient and impractical for digital logic testing and repair. First, the dramatic increase in the use of medium and large scale integration (MSI and LSI) technology has raised the level of circuit complexity to a point where manual diagnosis of a faulty logic board may require several hours, if not days. At the same time, high volume production of digital assemblies, from mini-computers to traffic light controllers, has spotlighted the need to reduce recurring costs of logic testing. Finally, the cost of an army of skilled technicians, all intimately familiar with the workings of the logic boards they are testing, has become too high to be practical for all except the lowest volume applications. Thus there is a great need for automated test equipment which provides fast, accurate diagnosis of faulty behaviour in complex circuits without requiring highly skilled personnel.

The present invention provides such a technique for automatically diagnosing logic failures by simulating possible fault mechanisms on-line in accordance with any of a number of well-known simulation techniques, as will be described hereinafter.

In order to clarify the discussion of fault diagnosis, however, several definitions are in order. An external is any signal made in a logic network which is directly connected to a test fixture. Thus, an external input is a signal line directly connecting the input of some logical device in the circuit with the test fixture, and an external output similarly connects a logical output to the test system. A test step is a set of values, one for each external input and output, so that application of the external input values to the network under test will yield the set of output values on the external outputs for the correctly operating board.

In a sequential network, it is usually not possible to determine test steps except in the context of previous test steps, since the output values at the circuitry depend not only on present inputs but also on a finite number of past inputs and outputs. Thus we further define a test program as a finite sequence of test steps designed to distinguish the operation of a correctly functioning circuit from many possible incorrectly functioning circuits.

A set of likely failures which a test program is designed to detect is called a fault set. As an example, the most widely used fault set is the set of failures which causes one node in the logic network to become permanently stuck at either the logical 0 or logical 1 level. These conditions are abbreviated SA0 and SA1, respectively. The present invention expands the classical fault sets that are automatically diagnosed, by including shorts and several multiple failures. Subsets of a fault set, which are indistinguishable at the externals due to the topological structure of the logic network, may be collected into an equivalence class. Thus, a fault class is defined as a set of faults that, as observed from the externals of the network, are equivalent in their behaviour. For example, in FIG. 1A, Gate A, Pin 1 stuck at 1 is indistinguishable from Gate A, Pin 2 stuck at 0, which is in turn indistinguishable from Gate B, Pin 1 stuck at 0, and so on. Using a shorthand notation in which "." is read as "pin" and "-" is read as "stuck at," we write:

Fault Class 6: A.1-1 A.2-0 B.1-0 B.2-1 C.1-1 C.2-0

Considering the isolating of failures using only information at the edge connector pins (externals), fault-finding aids generally perform diagnosis by matching the behaviour of the physical faulty network with a stored image of the behaviour of certain faults. Acquiring this image is done by considering some set of likely faults and simulating their behaviour, given the input stimuli of the test program. Simulation may be either via physical insertion of each failure into the circuit or by software modeling of the effects of each fault on the logic network. Since a reasonably complete set of possible faults for a complex board may have several thousand elements, physical fault insertion is cumbersome at best, and usually impractical. Software simulation offers several advantages. Since faults are automatically inserted into a model of the network, the effects of changes to either the unit under test or UUT (as in engineering changes), or the test program can easily and rapidly be taken into account. In addition, outputs that should be ignored because of noninitialized sequential logic are automatically determined and recorded.

The information that is recorded concerning the behaviour of possible faults is generally stored in a data base previously described as a fault dictionary. The extent of these data varies from simply noting at which test step the fault is detected, to completely recording all external values for all test steps for each fault. The advantage of the latter is that it most uniquely characterizes the behaviour of a faulty circuit, given a particular test program. Unfortunately, this approach is untenable in all but the largest, full-scale, computer-based systems, as it requires great quantities of random access bulk storage, as before discussed. As an example, consider a circuit for which 2500 fault classes are modeled (this would be the size of a typical fault set for a network with about 120 IC packages) and which has 200 externals. A typical test program to detect 98% of the faults might take 500 to 1000 test steps. To record a full fault dictionary would thus require more than $500 \times 200 \times 2500 = 2.5 \times 10^8$ bits. Although the full fault dictionary may be reduced without losing any information, the amount of data will still be near the same order of magnitude. Methods that abbreviate this fault dictionary (as in storing only the failing test step numbers) have the inherent disadvantage of losing resolution; i.e., different faults that could theoretically be distinguished are not, resulting in vague diagnostic messages from the system at test time.

To overcome the problems of poor diagnostic resolution on the one hand and excessive storage requirements on the other, the present invention first stores a small portion of the fault dictionary composed of the result of one test step for each possible fault. (In the example above, this amounts to $1 \times 200 \times 2500 = 5 \times 10^5$ bits, which is reasonable for a disk mass storage device). Then, during actual testing, parts of the fault dictionary which are required for diagnosis of a particular faulty circuit are generated on-line via simulation. Thus the full diagnostic resolution inherent in a test program is preserved while at the same time storage requirements are kept manageable.

Before explaining in detail the operation of the automatic fault location capabilities of the invention, it is in order to mention the preferred software modules designed to aid in the generation of test programs for digital networks and to pinpoint failures on these networks automatically during testing. There are two basic input files to the system; namely, a description of the logic network and a set of input stimuli which are to be applied to the network.

Given these two inputs, the invention uses a digital logic simulator automatically to generate the output responses of the correctly functioning network for each test step, thus creating a complete test program for the network. The system then goes on to evaluate the efficacy of the test program in detecting the likely failure that might occur on a physical board. In evaluating the test program, the following types of failures may be considered by the system, depending upon user-selected options:

(1) inputs and outputs stuck at a logical 0 or 1, corresponding to many failures, such as shorts to ground or power tracks, or open connections to IC pins;

(2) power loss to an IC, caused by an open or poor connection on the board;

(3) shorts between adjacent pins on IC's, caused by solder splashes on the circuit board art work, or broken wire fragments in a wire-wrap board;

(4) any bridging (short) failure that has been determined as likely to occur by the engineer generating the test program, perhaps because of the proximity of two adjacent tracks on the printed circuit; and (5) any open connection, such as a faulty plated through hole, which occurs at any location on the board, as specified by the test engineer.

The above faults are simulated by inserting them in turn into the same model of the physical circuit that is used to determine the output patterns for the good board. A fault is said to be detected if for some test step the external values generated by the faulty network differ from those values generated by the good circuit.

The system of the invention, in addition to determining whether a test program can detect these failures, stores diagnostic information which is later used in the automatic fault location program. Since the only inputs necessary are a network description and a set of input stimuli, moreover, it is possible to generate a high quality test program for a circuit before it is in production, and even before a prototype is available.

The diagnostic files, which can be viewed as comprising a skeleton fault dictionary, contain essentially the following information:

(1) for each test step, the fault classes that are first detected at that step; and (2) for each fault class, the external signature of that fault class at its first failing test step.

An external signature means the set of logical values that are observed on the externals in the presence of a particular fault at a given test step. The "first failing test step" is the first test step in the test program sequence for which, given a particular fault, at least one of the externals differs in value from that expected on a known good circuit.

Finally, the diagnostic fault information is sorted so that fault classes with identical first failing test step numbers and external signatures are grouped together. Thus, we define a fault group as a set of fault classes that have identical behaviour up to and including the first failing test step.

Figure 1A:
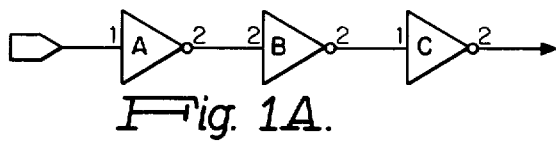
FIGS. 1A, 1B and 1C are partial schematic block diagrams of illustrative circuits which serve as examples to explain the underlying diagnostic operation.
Figure 1B:
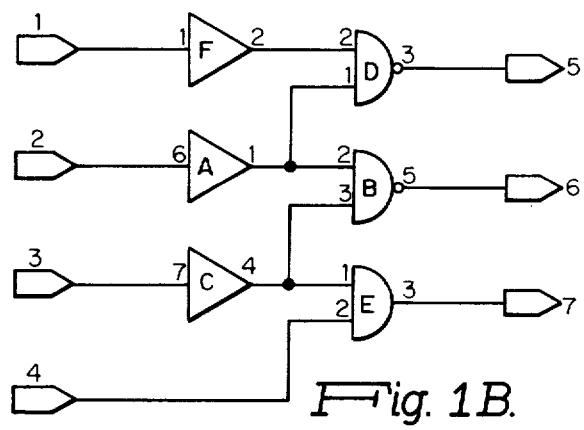

Consider, for example, the circuit of FIG. 1B, and that it is given that the input stimulus at test step 2 was 0110 on nodes 1 through 4. The expected response on nodes 5 to 7 would be 100. However, when simulating the network for any of the faults A.1-0, C.4-0, or B.5-1, above, we will observe the outputs on nodes 5–7 to be 110. All three of the faults mentioned are detected by the input stimulus at this test step, and in addition they have the same external signature at this test step, so we say that they are all in the same fault group.

Once a test program has been generated and graded for its percentage of fault classes detected, the system is ready for automatic testing and diagnosis of physical circuits.

When a faulty circuit board is encountered during testing, the entire set of results (external input and output values) at each test step of the test program is recorded by the tester for comparison with possible fault mechanisms modeled by the software. In addition, the tester notes the first failing test step number. Using this number, the automatic fault location program of the invention finds all fault groups that are detected at this test step. It then compares the output signatures of each such fault group with the physical output signature of the failing circuit, taking into account any externals which may not have been initialized into a known state. Note that this initial comparison is made only for the first failing test step, since this is the only information kept in the skeleton fault dictionary. In most cases, a match will be found between the physical output signature and some fault group. If no match is found, however, then the behaviour of the physical circuit does not correspond to any of the faults modeled. If, however, a match is found, then the faults in that fault group are selected for simulation. These faults are displayed to the operator as an initial diagnostic message.

In the case of the simple example previously discussed (network shown in FIG. 1B), this initial message would appear as:

| A. 1-0 | B. 2-0 | D. 1-0 |
| --- | --- | --- |

| -continued | | |
|---|---|---|
| B. 5-1 | EXT6-1 | |
| C. 4-0 | B. 3-0 | E. 1-0 |

Figure 1C:
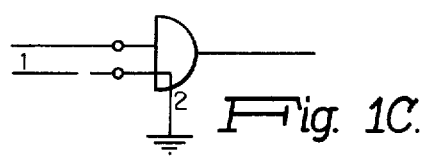

This would be read as: IC A Pin 1 stuck at 0, connected to IC B Pin 2 and IC D Pin 1; or IC B Pin 5 stuck at 1 or External 6 stuck at 1; or IC C Pin 4 stuck at 0, connected to IC B Pin 3 and IC E Pin 1. Note that on the second line, two faults appear. These two faults are collected into one equivalent fault class since they are indistinguishable at the externals, independent of the input stimuli that are applied. Other faults indistinguishable from B.5-1 and EXT6-1 are inputs to Gate B stuck at 0 (written B.2-0 and B.3-0). These faults were not indicated in the example simply because an input stuck at 0 failure is extremely rare in transistor-transistor logic (TTL) and similar logic circuits. This is because, in reality, it corresponds to two failures occurring on the circuit; namely, an open circuit to the input, and the input internally shorted to ground, as shown in FIG. 1C.

Once the possible fault mechanisms have been selected by a table lock-up, the fault simulator is called upon to verify the faulty behaviour of the physical circuit against the selected faults. This is done by simulating each fault found in the initial lock-up through the entire test program and comparing the expected outputs at each step with the actual faulty circuit outputs. Only when fault model behaviour matches that of the physical circuit at each external for each step of the test program is a "verified" diagnosis given.

Let us suppose, for example, that in the circuit of FIG. 1B, the test program contained the following input stimuli and expected responses:

| | | $t_1$ | $t_2$ | $t_3$ |
|---|---|---|---|---|
| External | 1 | 0 | 0 | 1 |
| | 2 | 0 | 1 | 1 |
| | 3 | 0 | 1 | 1 |
| | 4 | 0 | 0 | 1 |
| | 5 | 1 | 1 | 0 |
| | 6 | 1 | 0 | 0 |
| | 7 | 0 | 0 | 1 |

Now further suppose that the externals recorded by the tester are as follows:

| | | $t_1$ | $t_2$ | $t_3$ |
|---|---|---|---|---|
| External | 1 | 0 | 0 | 1 |
| | 2 | 0 | 1 | 1 |
| | 3 | 0 | 1 | 1 |
| | 4 | 0 | 0 | 1 |
| | 5 | 1 | 1 | 0 |
| | 6 | 1 | 0 | 0 |
| | 7 | 0 | 0 | 1 |

Clearly, the first failing test step is $t_2$. Using the analysis of the previous section, we see that three fault classes must be simulated; namely, $F_1$: A.1-0
$F_2$: B.5-1 EXT6-1
$F_3$: C.4-0

Simulation results for the three fault classes above are shown below:

| | | $F_1$: | | | $F_2$: | | | $F_3$: | | |
|---|---|---|---|---|---|---|---|---|---|---|
| | | $t_1$ | $t_2$ | $t_3$ | $t_1$ | $t_2$ | $t_3$ | $t_1$ | $t_2$ | $t_3$ |
| External | 1 | 0 | 0 | 1 | 0 | 0 | 1 | 0 | 0 | 1 |
| | 2 | 0 | 1 | 1 | 0 | 1 | 1 | 0 | 1 | 1 |
| | 3 | 0 | 1 | 1 | 0 | 1 | 1 | 0 | 1 | 1 |
| | 4 | 0 | 0 | 1 | 0 | 0 | 1 | 0 | 0 | 1 |
| | 5 | 1 | 1 | 1 | 1 | 1 | 0 | 1 | 1 | 0 |
| | 6 | 1 | 1 | 1 | 1 | 1 | 1 | 1 | 1 | 1 |
| | 7 | 0 | 0 | 1 | 0 | 0 | 1 | 0 | 0 | 0 |

The only simulation which matches the recorded faulty behaviour, however, is that for $F_2$. Thus, the fault class $F_2$ is indicated as the cause of circuit failure. Since the simulation makes use of every bit of data available at the external nodes for comparison with its fault model, maximum or optimum possible diagnostic resolution is achieved. At the same time, an exact match between the physical fault and its computer model guarantees the accuracy of the model and therefore the test program evaluation.

All these operations are performed, for the "average" board (50 IC's, 200 test steps), in well under a minute in the later-mentioned equipment of the General Radio Company, assignee of the present invention.

Figure 2:
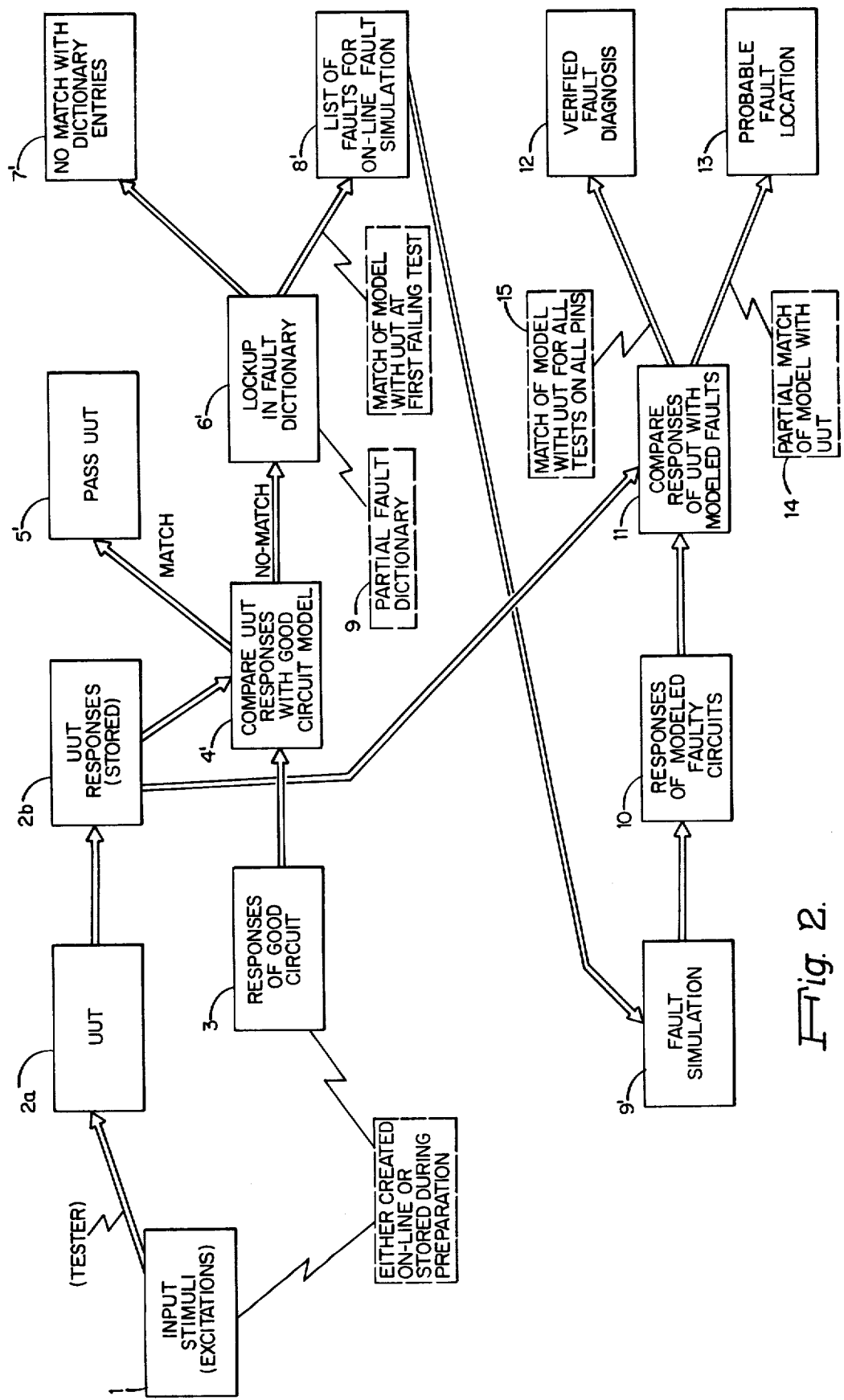
FIG. 2 is a similar diagram of the testing and diagnostic phase.

It is now in order to describe in more detail the functional or flow operation of the process in connection with the steps illustrated in FIGS. 1 and 2, first recapitulating the basic requirements and advantages of such steps over prior approaches. As previously explained, considering the invention as illustratively applied to the diagnostic testing of digital circuits and the like, there are several requirements for the accurate testing and diagnosis of the digital circuit boards. First, it is necessary to establish an effective test procedure which consists of the before-delineated input stimuli or excitations, plus the responses expected from a good network. Secondly, it is necessary exactly to determine the extent to which this test program will detect typical fault mechanisms on digital circuit boards. This allows test programs which do not meet some minimum figure of merit, to be improved. Thirdly, some data to be used during the diagnosis of bad UUT's must be prepared. Finally, an effective process automatically to diagnose bad UUT's must be established. The data for this process is, in accordance with the invention, set up during a preparation mode, illustrated in FIG. 1, while the process itself is used during the testing mode, FIG. 2.

PREPARATION MODE (FIG. 1)

This mode:
(a) aids in test program generation;
(b) evaluates the quality of the test program for fault detection and diagnostic resolution;
(c) prepares data for automated diagnosis.

In the past, as before explained, others have carried out part or parts of this phase either on a very large computer by simulation of the UUT (for example, in the previously mentioned Telpar systems and in the Fairchild FAIRSIM system—Fairsim II User's Manual, 1969) or with a physical known good board on the tester itself (for example, said "CAPABLE" system).

The previously discussed and other disadvantages of using a large computer are obvious. Since the computer is very expensive, it is usually not part of a test system. Thus, the analysis is carried out off-line, resulting in slow turnaround and large overhead costs. In addition, the usage of such a system is expensive for small users, even if it is accessible via a telephone line. Finally, such a system does not allow a cost effective expansion to test networks with complex large scale integrated circuit (LSI) chips, for which an accurate model may not be easily generated.

The disadvantages of using a known good board as a means for preparation are similarly obvious.

First, a known good board (KGB) is often not available or is actually faulty. Second, some inconsistency between a schematic circuit diagram and the KGB may exist and not be found during the preparation phase, resulting in possible bad diagnosis during testing. Third, the KBG approach does not indicate unknown or not necessary determined states (X-state), and initialization and race problems may go unnoticed during the preparation phase. Again this may cause problems during testing. Fourth, manual intervention is required, making the procedure slow and error-prone. Fifth, the evaluation of the test program is based on physical failure insertion. The previously-mentioned manual process involved is also replete with problems. For example, the before-described approach taken by CAI, supra, requires that IC's be removed from the KGB and inserted into a special test fixture. This test fixture is in turn connected to the KGB at the missing IC socket via a cable that may be several feet long. Thus, boards with several types of high-speed logic, such as emitter coupled logic (ECL) and Schottky-transistor-transistor logic (TTL), may not be analyzed by this technique. Sixth, the KGB approach cannot be extended to provide an automatic test generation capability.

To overcome the problems of these earlier approaches, the process of the present invention simulates complex digital circuits on a minicomputer, which is an integral part of the test system, as later described. In addition to exhibiting none of the shortcomings of previous approaches, this method implicitly facilitates the analysis of complex failure mechanisms, such as bridging faults, including shorts.

Turning, thus, to the specific functional or flow charts of FIGS. 1 and 2, there is shown the particular implementation in which on-line simulation of faulty circuit behaviour is used automatically to test and diagnose digital logic circuits.

The two parts of the process by which circuits are automatically diagnosed consists of the previously described:

1. preparation of data which partially characterizes the behaviour of a large number of different faults on circuits of the type which are to be tested, as shown in FIG. 1; and
2. comparison of the electrical responses of a physical circuit under test with the computed responses of corresponding digital circuit models, which are simulated on-line at the time the circuit is tested, as illustrated in FIG. 2.

Referring to FIG. 1, (the preparation of diagnostic data), the behaviour of a digital circuit under the application of a programmed set of input stimuli 1 is simulated at 2, and the expected responses of a fault-free circuit are thereby computed at 3. In addition, the effect of a large number of different likely faults on this circuit is determined by simulating the behaviour of the circuit in the presence of each fault, as at 4. As before explained, the types of faults simulated include shorts between different logic signals, as well as those faults which cause any lead in a digital logic circuit to become permanently fixed at one logic level. The types, numbers and locations of the faults to be simulated will naturally depend upon the particular circuit being tested, and may be conveniently specified in advance by the circuit designer. By computing the responses of faulty circuits at 5, and comparing these responses at 6 with those of the fault-free circuit, the following data are obtained:

1. the percentage of the simulated faults which are detected by a given test sequence at 7 (a fault is detected if the responses of the circuit in the presence of a fault are different from those of a fault-free circuit);
2. a list of faults which are not detected, at 8; and
3. a partial fault dictionary at 9, indicating the responses of a faulty circuit for the first test in which the response differs from that of the good circuit (i.e. the first failing test). In addition, this partial fault dictionary is indexed by the number of the first failing test, to facilitate a look-up and match in the second phase of the process, later explained.

Turning now, to FIG. 2, (circuit testing and diagnosis) a sequence of programmed input stimuli is applied at 1 to a unit under test (UUT) 2a, and the electrical responses of this circuit are recorded for each successive input stimulus in the sequence at 2b. The particular input stimuli corresponding to the set of tests to be applied to the circuit under test are also dependent upon the particular type of circuit being tested, and may also be prepared in advanced in accordance with well-known techniques. Subsequently, this set of recorded responses is compared at 4' with the set of responses expected from a fault-free circuit established at 3 in FIG. 1. If the above two responses match, then the circuit is said to pass the test, as indicated at 5'. If, on the other hand, there is a variation or difference between these responses, the test number at which a difference first occurs is used as an index at 6' into the partial fault dictionary 9 of FIG. 1. At this point, a match is sought between the response of the electrical circuit and computed responses of modeled faulty circuits (in the dictionary). If no match is found between the modeled faulty networks and the UUT response, then an automatic diagnosis is not made at 7'. However, for the usual case in which a match is found, all modeled faulty circuits which match the response of the electrical circuit at the first failing test are automatically selected for simulation at 8'.

The responses at 10 of these modeled circuits are now computed by simulation at 9' and compared with the responses of the UUT at 11. A verified diagnosis is given when the behaviour of the UUT exactly matches the behaviour of some modeled fault on every output and for all tests, as computed by the on-line simulation at 12. If there is no exact match between the behaviour of any modeled fault and that of the UUT, then a probable diagnosis is given at 13 for that fault which matches the UUT behaviour for the largest number of steps in the test sequence. In other words, a probable diagnosis is given for that fault which first mismatches UUT behaviour at the highest test step number. The diagnosis is given as a printout or display of the appropriate modeled fault(s) which matched UUT behaviour, along with an indication of whether the match was partial or complete, as at 14 and 15, respectively.

While the implementation of the process, once described as above, will probably readily be evident to one skilled in this and the related computer art, and while it is desired not to clutter the description with details of well-known circuitry and programming techniques, it may be useful to indicate sufficient circuit and computer operational specifies to make evident the preferred configurations and operation.

Figure 3:
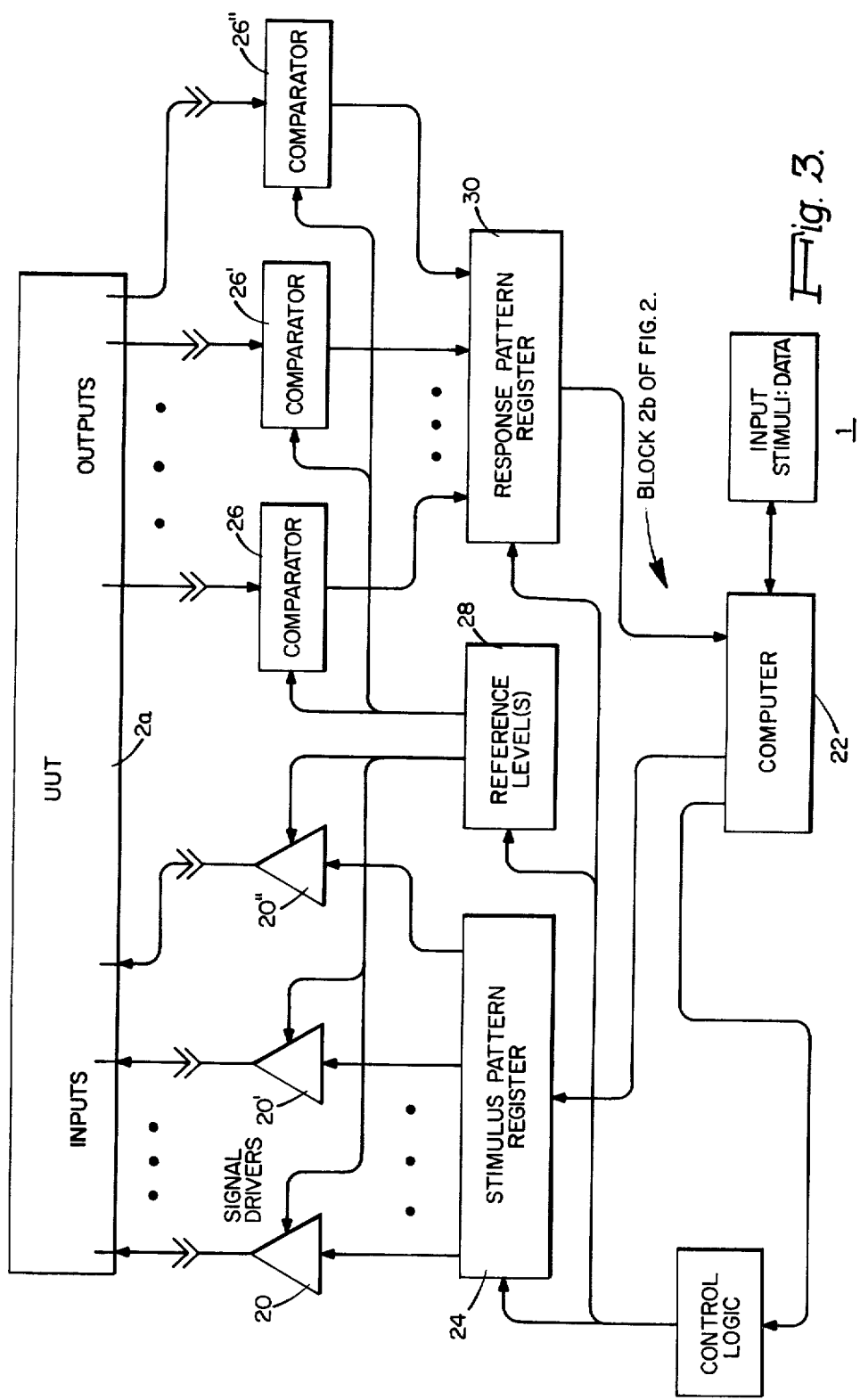
FIG. 3 is a schematic diagram of preferred circuits for practicing the inventive process.

While the diagrams of FIGS. 1 and 2 functionally describe the underlying operation, FIG. 3 illustrates preferred circuit elements for effecting these functions in connection with a mini-computer. The unit under test (UUT) 2a is shown provided with inputs from signal driver amplifiers 20, 20', 20", etc. that receive the data of a given test, as conventionally sequenced by a mini-computer 22, such as the Digital Equipment Corporation PDP-8E computer, which loads the stimulus data into the stimulus pattern register 24, such as a latch-type storage register. The output responses of the UUT 2a are compared by respective comparators 26, 26', 26", etc. with reference level(s) 28, to determine the logical states of the outputs of the UUT, the aggregate of which is the response pattern. This pattern is stored in a response pattern register 30 and thence read into the computer 22; this being the storage function 2b of FIG. 2, resulting from functional stages 1 and 2a thereof.

The thusly stored UUT responses at 2b (FIG. 2) are compared with the responses of a good circuit 3 (FIGS. 1 and 2), as well known, within the PDP-8E or similar computer 22 in the basic instruction capability thereof, as described in the said Digital Equipment Corporation handbooks, "Introduction To Programming" and "PDP-8E & PDP-8M Sanall Computer Handbook", (1969-72). For deriving the responses at 3, the simulation function 2 of FIG. 1 may be attained, for example, by using the "logical" and, the "logical complement" and the "mask" instructions of said computer, as described in said handbooks, representing the logical connections and function of the circuit 3 that is to be tested. Such simulation processes are more fully described in "Logic Automated Stimulus and Response", User's Guide Version DIB, Digitest Inc., Dallas, Tex., 1973.

As another example, a preferred simulation technique at 2, FIG. 1 (and at 4, later described), may be of the type described in the thesis of one of the inventors herein, Haas, entitled *Bridging Fault Analysis In Digital Circuits,* Massachusetts Institute of Technology, February, 1974, Chapter 5. See, also, Second Workshop On Fault Detection & Diagnosis In Digital Systems, Lehigh University, Dec. 6-8, 1971, p. 115-117, on, for example, for further simulation techniques. Also, Section 3.4 of "Fault Diagnosis of Digital Systems". Chang et al, Wiley-Interscience, 1970. Other fault simulation techniques which may be employed are disclosed in U.S. Pat. No. 3,702,011 to Armstrong, issued Oct. 31, 1972; U.S. Pat. No. 3,780,277 to Armstrong, issued Dec. 18, 1973; and U.S. Pat. No. 3,715,573 to Vogelsberg, issued Feb. 6, 1973.

As before explained, if there is a match, an indicator, such as a green lamp, indicates "pass" at 5'; i.e. a good UUT is present. If there is no match, diagnosis is required of the fault, and the diagnostic process is initiated. The step in the test program at which the first failing response pattern at 30 (FIG. 3) is detected, as before explained, is used as the entry or index element into the partial fault dictionary 9 (FIGS. 1 and 2). Knowing this number, the computer searches the electrically retrievable stored partial fault dictionary (functionally indicated at 6' in FIG. 2), by its searching routine, as described in said handbooks, to locate and extract the "list" of possible faults corresponding to the matched modeled responses stored at 9. If such a "list" is found, as at 8', FIG. 2, then the on-line fault simulation process is invoked by simulating at 9', FIG. 2, to determine if the simulation of faulty circuits 4, FIG. 1, matches the actual responses of the faulty UUT. The simulation function 4 of FIG. 1, as before indicated, may be effected in the same manners described in connection with the simulation process 2. This may be effected by putting in one or more faults, and computing the responses of the circuit given such fault or faults. Thus the present invention does not require the presence of an actual good circuit as in the before-mentioned prior systems.

This process has computed the responses of circuits corresponding to the "list" of faults at 8', FIG. 2; and these responses are then compared at 11, FIG. 2, with the stored responses of the faulty UUT 2b. This is a similar process to the mechanism previously described in connection with the comparator 4'. Branch 12 provides an indication of a complete match of all responses between a simulated fault and the actual faulty UUT 2b, providing a diagnosis of the fault.

In the event that some tests match the model but some other tests do not match, the heuristic approach is invoked to identify a highly probable fault diagnosis. This may, for example, be effected by counting the number of matched tests in computer registers; the modeled fault with the highest count, being indicated as the probable fault. The handling of such problems by this heuristic technique has been found to be successful in over 90% of the cases in which faulty circuit behaviour was caused by failures other than those explicitly modeled. The technique employs the same strategy as outlined above but allows for only a partial match between the simulated network outputs and actual faulty behaviour. Success of this method hinges on the observation that multiple failures most often make themselves known one at a time in a test program, and that the first failing fault signature on the physical board usually will correspond to the fault signature of one of the faults. Similarly, a non-modeled short will usually manifest itself as a temporary "stuck" at 0 on one of the shorted outputs.

In this case of an imperfect match with any modeled fault, the automatic fault location program will indicate a probable fault location. This will correspond to the fault classes that match the operation of the physical circuit for the greatest number of test steps through the program.

Returning to FIG. 2 and the look-up process at 6', if no match with dictionary entries is effected, as at 7', then this process is terminated without identification of the fault at this point.

Since all the circuit details are not considered necessary to an understanding of the invention and its operation, reference is made to the Operating Instructions, Type 1792A and 1792B Logic Test Systems, Jan. 21, 1974 (Form 1792-0102F), the CAPS Operation Manual fo the Type 1792 Logic Test Systems, October, 1973 (Form 1792-0105E) and Parts Lists and Diagrams of Type 1792A and 1792B Logic Test Systems, September, 1973 (Form 1792-0104-A), of the assignee of the present application, General Radio Company of Concord, Mass.

Further modifications will occur to those skilled in this art, and such are considered to fall within the spirit and scope of the invention as defined in the appended claims.

What is claimed is:

1. A method of automatic fault diagnosis of an electrical circuit under test comprising applying a set of tests to the circuit under test; comparing the responses of the circuit under test with the responses of a good circuit to detect variations which are indicative of faults; selecting from a stored partial fault dictionary of modeled circuit faults a list of possible circuit faults which are capable of producing at least one of said variations; simulating on-line circuits having at least one of the faults from said list; generating the responses of the simulated circuits to the set of tests; and comparing the responses of the simulated circuits with the responses of the circuit under test to effect fault diagnosis.

2. A method as claimed in claim 1 and in which said last-named comparing step comprises matching all the responses of the circuit under test for all tests of said set to those of a simulated circuit to verify the fault diagnosis.

3. A method as claimed in claim 1 and in which said last-named comparing step comprises effecting a partial match of the responses of the circuit under test for some tests to corresponding responses of a simulated circuit to indicate probable fault location.

4. A method as claimed in claim 1, wherein said partial fault dictionary is prepared by simulating in response to the set of tests fault-free circuit responses; simulating in response to the same set of tests modeled faulty circuit responses; comparing the fault-free and faulty circuit responses in order to detect variations; and generating from said comparing, said partial fault dictionary by grouping all modeled circuit faults which produce the same variations for a particular one of the tests of said set.

5. Electrical circuit fault diagnosis apparatus for a circuit under test comprising means for applying a set of tests to the circuit under test; means for comparing the responses of the circuit under test with the responses of a good circuit to detect variations which are indicative of faults; means for selecting from a stored partial fault dictionary of modeled circuit faults a list of possible circuit faults which are capable of producing at least one of said variations; means for simulating on-line circuits having at least one of the faults from said list; means for generating the responses of the simulated circuits to said set of tests; and means for comparing the responses of the simulated circuits with the responses of the circuit under test to effect fault diagnosis.

6. Electrical circuit fault diagnosis apparatus as claimed in claim 5 and in which the last-named comparing means comprises means responsive to the matching of all the responses of the circuit under test for all tests to those of a simulated circuit to verify the fault diagnosis.

7. Electrical circuit fault diagnosis apparatus as claimed in claim 5 and in which the last-named comparing means comprises means responsive to a partial matching of some of the responses of the circuit under test for some tests to corresponding responses of a simulated circuit to indicate probable fault location.

8. Electrical circuit fault diagnosis apparatus as claimed in claim 5 comprising means for storing the responses of the circuit under test and means for storing the responses of the good circuit.

9. Electrical circuit fault diagnosis apparatus as claimed in claim 5 in which the first-mentioned means comprises stimulus pattern register means for storing input tests of said set; signal driver means connected to the stimulus pattern register means for applying the input tests to the circuit under test; and response pattern register means for storing the circuit responses to said input tests.

* * * * *